United States Patent Office 3,455,650
Patented July 15, 1969

3,455,650
PRODUCTION OF HYDROGEN FLUORIDE
Joseph G. Conte, Oakhurst, and Paul S. Spitaleri, Hazlet, N.J., and Martin Cohen, New York, N.Y., assignors to Continental Oil Company, Ponca City, Okla., a corporation of Delaware
No Drawing. Filed Mar. 8, 1967, Ser. No. 621,435
Int. Cl. C01b 7/22
U.S. Cl. 23—153       9 Claims

ABSTRACT OF THE DISCLOSURE

Hydrogen fluoride is recovered from an ammonium fluoride-bifluoride liquor by reacting it with sulfuric or phosphoric acid, stripping out a dilute hydrogen fluoride gas stream, and desiccating the gas stream.

---

This invention relates to a process for producing hydrogen fluoride. In one aspect, the invention relates to a process for reducing air pollution from a phosphatic fertilizer plant by recovering hydrogen fluoride from its off-gas. In another aspect, the invention relates to recovery of hydrogen fluoride values from byproduct gases of a phosphatic fertilizer plant.

In the manufacture of superphosphates by the reaction of phosphate rock with acids such as sulfuric acid, phosphoric acid and the like, gases are evolved which contain hydrogen fluoride, silicon tetrafluoride and other vapors. Similar fluorine-containing gases are obtained during the concentration of phosphoric acid which has been produced by the reaction of phosphate rock with sulfuric acid.

Numerous processes have been developed to recover the fluorine compounds from these gases in a form which will have accepted utility in commerce. These processes usually include steps in which the gases are absorbed in an aqueous medium and reacted with calcium, sodium or potassium compounds to produce the silicofluorides of calcium, sodium or potassium, respectively.

It is an object of the present invention to provide a method for the production of hydrogen fluoride from a fluorine-containing ammonium composition.

It is another object of this invention to provide a method of recovering ammonium sulfate in a process in which hydrogen fluoride is produced from a fluorine-containing ammonium composition.

It is another object of this invention to provide a method of recovering ammonium phosphate compounds in a process in which hydrogen fluoride is produced from a fluorine-containing ammonium composition.

According to the invention, a fluorine-containing ammonium composition is reacted with an aqueous solution of a strong nonvolatile mineral acid, and the resulting composition is stripped with hot gas to recover a mixture of hydrogen fluoride, water vapor and stripping gas; the remaining liquid phase is useful as a fertilizer material. As used herein, fluorine-containing ammonium composition refers to compositions comprising ammonium fluoride, ammonium bifluoride, and mixtures thereof.

It is currently common practice to recover hydrogen fluoride and silicon tetrafluoride from the off-gas of phosphatic fertilizer processes, such as den gases from acid treatment of phosphate rock or stack gases from evaporation of wet-process phosphoric acid, by contacting these gases with water, which actually becomes a solution of fluosilicic acid. This procedure is often necessary in certain localities to prevent pollution of the surrounding area; some values can be obtained, as mentioned, by reacting this scrubbing liquid with a metal salt to produce the corresponding metal fluosilicate, but the market for these fluosilicates is limited. In any event, the scrubbing of these gases proceeds according to the following equations:

(1) $SiF_4 + 2HF \rightarrow H_2SiF_6$
(2) $3SiF_4 + 2H_2O \rightarrow 2H_2SiF_6 + SiO_2$ The silica can be removed from the scrubbing liquid by e.g. filtration at this point or, alternatively, the liquid is preferably reacted with aqueous or anhydrous ammonia to produce the fluorine-containing ammonia composition and additional silica, which is removed simultaneously with the silica produced by Equation 2. Ammoniation of the scrubbing liquor proceeds according to one or both of the following equations, depending on the amount of ammonia added, but primarily by Equation 3:

(3) $H_2SiF_6 + 6NH_3 + 2H_2O \rightarrow 6NH_4F + SiO_2$
(4) $H_2SiF_6 + 3NH_3 + 2H_2O \rightarrow 3NH_4HF_2 + SiO_2$ After removal of the silica, there remains an aqueous solution of ammonium fluoride, sometimes with small amounts of ammonium bifluoride also present. Then, according to the present invention, this solution is reacted with a solution of a strong nonvolatile acid such as phosphoric or sulfuric acid. When phosphoric acid is used, the reactions with the fluoride solution proceed as follows:

(5) $H_3PO_4 + NH_4F \rightarrow HF + NH_4H_2PO_4$
(6) $H_3PO_4 + NH_4HF_2 \rightarrow 2HF + NH_4H_2PO_4$ and when sulfuric acid is used, the reactions are:

(7) $H_2SO_4 + NH_4F \rightarrow HF + NH_4HSO_4$
(8) $H_2SO_4 + NH_4HF_2 \rightarrow 2HF + NH_4HSO_4$ It is possible to further neutralize the acid, depending on the amount of acid used. Thus, as an alternative to equation 5 there can occur:

$$3H_3PO_4 + 5NH_4F \rightarrow 2(NH_4)_2HPO_4 + NH_4H_2PO_4 + 5HF$$

and as an alternative to Equation 7:

$$H_2SO_4 + 2NH_4F \rightarrow (NH_4)_2SO_4 + 2HF$$

Other strong nonvolatile mineral acids such as perchloric acid can be used, but are less preferred because the salt solutions which they produce generally do not have fertilizer utility. It is important during these reactions to maintain a sufficiently low salts concentration to prevent precipitation of appreciable solid salts during the subsequent stripping operation. After acidulation of the fluoride solution according to either set of Equations 5 and 6 or 7 and 8, the resulting composition is subjected to a relatively high temperature stripping operation. A stripping gas, for example, a hot combustion or flue gas, is bubbled or sparged through the solution to volatilize the hydrogen fluoride from the reaction mixture. The resulting vapors comprise a mixture of the hydrogen fluoride, water vapor, and inert stripping gas plus some unconverted silicon tetrafluoride. This mixture is then passed into contact with a strong desiccating agent such as concentrated sulfuric acid to remove the water vapor, and the remaining mixture of hydrogen fluoride and inert gas can then be conventionally separated, such as by fractional condensation or fractionation. The sulfuric acid, after serving as the desiccant, can be reconcentrated or can alternatively serve as reagent for Equations 7 and 8. Although other desiccating agents can be used, sulfuric acid or oleum are most commercially feasible. The phase remaining after stripping of the acidulated fluoride solution comprises an ammonium salt in excess acid, such as monoammonium phosphate in phosphoric acid or ammonium bisulfate in sulfuric acid. In the former instance, the MAP solution is used as a raw material feed for a diammonium phosphate plant, and in the latter instance, additional ammoniation produces an ammonium sulfate solution which can be pelleted or otherwise treated as known in the art for its fertilizer values. Thus it is seen that there is produced a stream of high purity hydrogen fluoride and a solution of fertilizer values from off-gas byproducts by a simple and straightforward process.

The invention will now be further illustrated by the following examples.

EXAMPLE 1

Ammonium fluoride was reacted with a 2:1 molar excess of phosphoric acid (74.39% $H_3PO_4$) at room temperature. The solution was then heated to 180° C. and sparged with air. In duplicate runs, 93.4 and 95.3% of the fluorine content of the feed was removed as hydrogen fluoride.

EXAMPLE 2

Off-gas from a concentration of wet-process phosphoric acid, containing HF and $SiF_4$ is passed to a water scrubber. There results an aqueous solution of fluosilicic acid at about 960#/hr. of contained $H_2SiF_6$. This solution is reacted with about 748#/hr. of ammonia, which is a 10% excess of $NH_3$ over fluorine on a molar basis, and the resulting solution is filtered to remove silica. The solution is then reacted with about 11650#/hr. of 74 percent phosphoric acid and is heated to about 140–200° C. and stripped with hot combustion gas. The vapors are contacted with concentrated sulfuric acid to remove water vapor, and then cooled to condense essentially anhydrous HF at a rate of about 684#/hr. The stripped liquid comprises a solution of about 4554#/hr. monoammonium phosphate in about 4740#/hr. of phosphoric acid on a 100% $H_3PO_4$ basis, and is suitable as feed to a diammonium phosphate plant. This example shows an overall recovery of fluorine as HF of about 85%, and of $NH_3$ as MAP of about 90%.

It is important to note that acidulation of the ammoniated scrubbing solution is carried out with an excess of acid in order to prevent precipitation of the salts formed, with the consequent handling problems. Also, use of concentrated acids is preferred in order to reduce subsequent vaporization load, and the acidulation thus preferably results in a solution of salts in excess acid. The off-gas scrubbing and its subsequent ammoniation are both steps known in the prior art. Acidulation of the ammoniated scrubbing liquor requires use of a strong mineral acid in order to liberate the HF from the ammonium fluoride salts rapidly, and the acid need be of low volatility to prevent its loss into the hydrogen fluoride vapor product during the subsequent stripping. The stripping is preferably carried out a relatively high temperature, e.g., 140–200° C., and the stripping gas can be any gas inert to the system at the prevailing conditions. Higher temperatures favor faster evolution, but should not be so high as to cause volatilization of the mineral acid. All steps of the process can be carried out at about atmospheric pressure, although operation above or below atmospheric pressure are also acceptable.

Having thus described the invention by providing specific examples thereof, it is to be understood that no undue limitations or restrictions are to be drawn by reason thereof and that many variations and modifications are within the scope of the invention.

What is claimed is:

1. A process for recovering hydrogen fluoride from a fluorine-containing ammonium composition which comprises reacting said composition with an excess of a strong nonvolatile mineral acid, contacting the resulting solution with an inert gaseous stripping medium at elevated temperature, recovering from said contacting a vapor phase comprising hydrogen fluoride, water vapor and stripping medium, separating water vapor therefrom by contacting with a desiccating agent, separating from the remaining vapor phase a hydrogen fluoride product and also recovering from said contacting with a stripping medium a liquid phase comprising a portion of said mineral acid containing an ammonium salt of said acid.

2. The process of claim 1 wherein said elevated temperature is between about 140 and about 200° C.

3. The process of claim 2 wherein said mineral acid comprises phosphoric acid.

4. The process of claim 2 wherein said mineral acid comprises sulfuric acid.

5. A process for removing hydrogen fluoride values from gases containing silicon tetrafluoride which comprises scrubbing said gases with water to convert at least a portion of said silicon tetrafluoride to fluosilicic acid, reacting the resulting fluosilicic acid solution with at least about 3 moles of ammonia per mole of acid, admixing with the resulting ammonium fluorides solution an excess of a strong nonvolatile mineral acid, stripping at elevated temperature the resulting salts solution with an inert gas, recovering as vapors from said stripping a mixture of hydrogen fluoride, water vapor and inert gas, contacting said mixture with a desiccating agent to remove water vapors therefrom, separating from the remaining vapor a hydrogen fluoride product, and also recovering from said stripping a liquid phase product comprising a portion of said mineral acid containing an ammonium salt of said acid.

6. The process of claim 5 wherein said elevated temperature is between about 140 and about 200° C.

7. The process of claim 6 wherein said desiccating agent comprises concentrated sulfuric acid.

8. The process of claim 7 wherein said mineral acid is phosphoric acid.

9. The process of claim 7 wherein said mineral acid is sulfuric acid.

References Cited

UNITED STATES PATENTS 2,846,290   8/1958   Yacoe _____ 23—153

EDWARD STERN, Primary Examiner

U.S. Cl. X.R.

23—88, 107, 119, 182